(12) United States Patent
Jeon et al.

(10) Patent No.: US 9,062,762 B2
(45) Date of Patent: Jun. 23, 2015

(54) METHOD FOR CONTROLLING SHIFT OF AUTOMATIC TRANSMISSION IN VEHICLE

(71) Applicant: Hyundai Motor Company, Seoul (KR)

(72) Inventors: Byeong Wook Jeon, Seoul (KR); Joseph D Chang, Yongin-si (KR); Dong Hoon Jeong, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/143,411

(22) Filed: Dec. 30, 2013

(65) Prior Publication Data

US 2015/0066319 A1    Mar. 5, 2015

(30) Foreign Application Priority Data

Aug. 30, 2013  (KR) .................. 10-2013-0104030

(51) Int. Cl.
*F16H 59/00* (2006.01)
*F16H 61/02* (2006.01)

(52) U.S. Cl.
CPC .... *F16H 61/0213* (2013.01); *F16H 2061/0234* (2013.01); *F16H 2059/003* (2013.01)

(58) Field of Classification Search
CPC ................................................ F16H 2059/003
USPC ......................... 701/55, 56, 58, 59
See application file for complete search history.

(56) References Cited

U.S. PATENT DOCUMENTS

| 7,967,724 B2* | 6/2011 | Kojima et al. ................... 477/97 |
| 2007/0254774 A1* | 11/2007 | Poisson ......................... 477/115 |
| 2008/0177451 A1* | 7/2008 | Saitou et al. ..................... 701/55 |
| 2009/0265066 A1* | 10/2009 | Ogawa et al. .................... 701/55 |
| 2009/0312926 A1* | 12/2009 | MacFarlane et al. ........... 701/59 |
| 2012/0323831 A1* | 12/2012 | Jeon ................................. 706/23 |

FOREIGN PATENT DOCUMENTS

| JP | 2010-71299 A | 4/2010 |
| JP | 2012-127448 A | 7/2012 |
| KR | 10-0836914 B1 | 6/2008 |

* cited by examiner

*Primary Examiner* — Edwin A Young
(74) *Attorney, Agent, or Firm* — Morgan, Lewis & Bockius LLP

(57) ABSTRACT

A method for controlling a shift of an automatic transmission in a vehicle may include calculating a first long-term driving style index by using running information in the running mode, calculating a second long-term driving style index by using running information in the sports mode, when the vehicle is switched from the running mode to the sports mode, temporarily storing the first long-term driving style index at the switching point, and when the sports mode is switched to the running mode, if the second long-term driving style index is greater than the temporarily stored first long-term driving style index, updating the second long-term driving style index as a final long-term driving style index, and determining a driving style.

8 Claims, 2 Drawing Sheets

METHOD FOR CONTROLLING SHIFT OF AUTOMATIC TRANSMISSION IN VEHICLE

CROSS-REFERENCE TO RELATED APPLICATION

The present application claims priority of Korean Patent Application Number 10-2013-0104030 filed Aug. 30, 2013, the entire contents of which application is incorporated herein for all purposes by this reference.

BACKGROUND OF INVENTION

1. Field of Invention

The present invention relates to a method for controlling a shift of an automatic transmission and, more particularly, to a method for controlling a shift of an automatic transmission to fit a driving style of a driver.

2. Description of Related Art

A gear lever (or a shift gear) is disposed near a driver's seat in a vehicle, and a running speed of the vehicle is adjusted by regulating the number of a gear shift stage of a transmission that converts power of an engine through selection of a gear shift stage by the gear lever. An automatic transmission adjusts a gear shift stage by applying a predetermined shift pattern to a control unit according to a running state of a vehicle, and includes a shift range of parking (P), reverse (R), neutral (N), driving (D).

A range selection of the gear lever is detected by an inhibitor switch and transmitted to a transmission control unit (TCU), and the TCU sets a gear shift stage by applying an appropriate shift pattern and drives a hydraulic system to shift gear.

Recently, in order to select various shift patterns, an automatic transmission further includes a manual shift mode (a sports mode), in addition to the automatic shift modes of parking (P), reverse (R), neutral (N), and driving (D). The manual shift mode provides an up/down shift by manipulating a gear lever forwardly (+) and backwardly (−). In the manual shift mode, a gear may be shifted in a state in which a driver steps on a gas pedal (or an accelerator), reducing power loss and providing high driving performance.

Meanwhile, drivers' satisfaction with vehicle running performance depends upon how a vehicle runs according to drivers' tendency (or style). However, drivers' tendencies vary, while the same type of vehicle has single fixed performance characteristics, and thus, there may be a difference between drivers' driving styles and a vehicle reaction.

Thus, a method for learning a driving style of a driver and controlling a shift according to the learned driving style has been developed. For example, whether a driver has a mild driving style of a defensive running pattern with a gentle acceleration habit or whether a driver has a sporty driving style of an aggressive running pattern with a rapid acceleration habit may be determined, based on which a shift pattern, an engine torque map, an engine torque filter, and the like, may be controlled.

The information disclosed in this Background section is only for enhancement of understanding of the general background of the invention and should not be taken as an acknowledgement or any form of suggestion that this information forms the prior art already known to a person skilled in the art.

BRIEF SUMMARY

However, a learning operation with respect to a driving style is performed only when a gear lever is positioned in the driving (D) range. Thus, when a driver frequently uses the manual shift mode, there may be a difference between the learning results and an actual driving style of the driver due to shortage of learning time. Various aspects of the present invention provide for a method for controlling a shift of an automatic transmission in a vehicle capable of performing customized gear shifting (or capable of shifting gears on behalf of individuals) by determining a driving style of a driver in an automatic shift mode and a manual shift mode.

Various aspects of the present invention provide for a method for controlling a shift of an automatic transmission in a vehicle including a gear lever shifted to any one of a running mode and a sports mode, including: calculating a first long-term driving style index by using running information in the running mode; calculating a second long-term driving style index by using running information in the sports mode; when the vehicle is switched from the running mode to the sports mode, temporarily storing the first long-term driving style index at the switching point; and when the sports mode is switched to the running mode, if the second long-term driving style index is greater than the temporarily stored first long-term driving style index, updating the second long-term driving style index as a final long-term driving style index, and determining a driving style.

The method may further include: initializing mode flags indicating switching states between the running mode and the sports mode by first and second values, respectively, with the first value. The calculating of the first long-term driving style index may include: calculating a short-term driving style index according to the running information; and if the mode flag has the first value when the vehicle enters the running mode, updating the first long-term driving style index to the final driving style index by using the short-term driving style indices accumulated during a predetermined period of time.

The running information may include a speed of the vehicle, a speed of a forward vehicle (or a vehicle ahead), and acceleration of the vehicle. The updating the first long-term driving style index to the final driving style index may include: when the mode flag has the second value, comparing a magnitude of the temporarily stored first long-term driving style index and that of the second long-term driving style index; and updating the mode flag to the first value.

The method may further include: when the second long-term driving style index is smaller than the temporarily stored first long-term driving style index, updating the first long-term driving style index as a final long-term driving style index.

The temporarily storing the first long-term driving style index may include: determining whether the mode flag has a first value when the vehicle enters the sports mode; when the mode flag has a first value, extracting the first long-term driving style index of the running mode immediately before entering the sports mode; and updating the mode flag to the second value. The method may further include: when the mode flag has the second value, calculating the second long-term driving style index.

According to various aspects of the present invention, since accumulated learning time is sufficiently secured by determining driving styles of a driver in each of a running mode and a sports mode, reliable learning results can be derived.

Also, according to various aspects of the present invention, since a case in which a driving style in a sports mode is mild, relative to an immediately previous running mode, is set as an exceptional condition, a long-term driving style index is prevented from being reduced to be smaller than that of the immediately previous running mode, thereby satisfying the driver's satisfaction with running.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
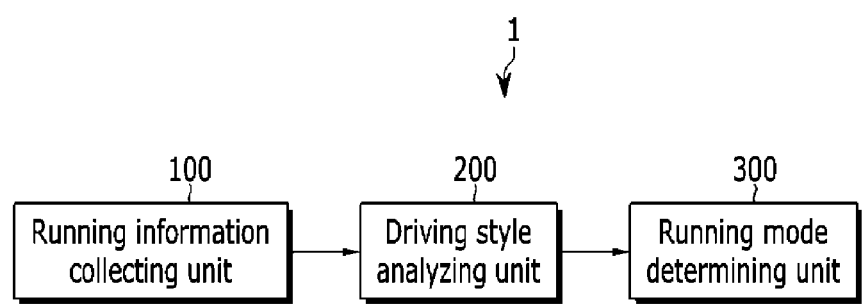
FIG. 1 is a schematic block diagram of an exemplary apparatus for controlling a shift of an automatic transmission in a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Accordingly, the drawings and description are to be regarded as illustrative in nature and not restrictive. Throughout the specification, similar reference numerals are used for the similar parts.

It will be understood that when an element is referred to as being "connected to" another element, it can be directly connected to the other element or intervening elements may also be present. In addition, unless explicitly described to the contrary, the word "comprise" and variations such as "comprises" or "comprising", will be understood to imply the inclusion of stated elements but not the exclusion of any other elements.

FIG. 1 is a schematic block diagram of an apparatus for controlling a shift of an automatic transmission in a vehicle according to various embodiments of the present invention.

Referring to FIG. 1, an apparatus 1 for controlling a shift of an automatic transmission in a vehicle according to various embodiments of the present invention includes a running information collecting unit 100, a driving style analyzing unit 200, and a running mode determining unit 300.

The running operation collecting unit 100 detects vehicle running information as a basis for determining a driving style of a driver, and to this end, the running information collecting unit 100 is connected to various sensors, controllers, and devices through an internal network of a vehicle.

For example, the running information collecting unit 100 may interwork with at least one of telematics collecting information regarding a speed sensor for sensing a vehicle speed, an accelerometer sensing acceleration of a vehicle, an inter-vehicle distance sensor sensing a relative distance between the vehicle ahead (or a forward vehicle) and a present vehicle, an accelerator pedal position sensor sensing an operation amount of an accelerator pedal, a brake pedal position sensor sensing a depressed amount of a brake pedal, a transmission control unit (TCU) sensing a position of a gear lever, a steering wheel sensor sensing a steered state of a vehicle, a vehicle location sensor sensing a location of a vehicle on the basis of GPS/GIS, a road type, and the like, congestion, weather information, and the like, of a running section, to collect running information.

The driving style analyzing unit 200 analyzes the driver's vehicle running information collected by the running information collecting unit 100 to determine a driving style of the driver. The driving style analyzing unit 200 according to various embodiments of the present invention receives information regarding a position of the gear lever from the running information collecting unit 100 and calculates and updates a long-term driving style index according to the information regarding a position of the gear lever.

Also, the driving style analyzing unit 200 may generate switching states between a running mode (i.e., a driving mode or a travel mode) and a sports mode as mode flags (Mflag), set the mode flags by a value 0 or 1, and store the same. In various embodiments of the present invention, a case in which the vehicle runs only in the running mode, namely, a case in which the vehicle has not been switched to the sports mode, is defined as an initial mode flag Mflag, and a case in which a value of the initial mode flag Mflag is set to 0 will be described as an example.

In detail, the driving style analyzing unit 200 calculates a first long-term driving style index SI_long1 while the vehicle is running in a state in which the gear lever is positioned in the driving (D) range (hereinafter, referred to as a 'running mode'), and calculates a second long-term driving style index SI_long2 while the vehicle is running in a state in which the gear lever is positioned in the manual shift mode.

Here, the driving style analyzing unit 200 accumulates vehicle running information for a predetermined period or by a predetermined number of times, and compares and analyzes average values of the accumulated running information to calculate the first and second long-term driving style indices SI_long1 and SI_long2 with a normal distribution-based probability value.

For example, the driving style analyzing unit 200 may calculate a short-term driving style index indicating a short-term driving style of the driver on the basis of running information during a relatively short period of time, and calculate a long-term driving style index by using the recent n number of short-term driving style indices. Here, the short-term driving style denotes a driving style of the driver during a current running period or a pre-set period of time of a running period, which may be determined by using a fuzzy control theory.

The driving style analyzing unit 200 may apply the fuzzy control theory to a relative speed with respect to the forward vehicle and acceleration of the vehicle to set a membership function of the relative speed with respect to the forward vehicle and the acceleration of the vehicle. The driving style analyzing unit 200 may calculate a fuzzy result value from the membership function.

For example, when a difference between a speed of the forward vehicle and a speed of the vehicle of the driver, namely, a relative speed value, is positive number (+) and the acceleration of the vehicle is less than a predetermined reference, the driving style analyzing unit 200 may determine that the short-term driving style of the driver is mild. Conversely, when the relative speed value is a negative number (−) and the acceleration of the vehicle is more than the predetermined reference, the driving style analyzing unit 200 may determine that the short-term driving style of the driver is sporty.

The driving style analyzing unit 200 may give weight values each having a predetermined magnitude to the n number of driving style indices to calculate a long-term driving style index. For example, the long-term driving style index may be calculated by dividing the sum of values which are obtained by multiplying the $1^{st}$ to nth short-term driving style indices and weight values together, by a pre-set time.

In this case, the short-term driving style which has been most recently calculated may be set to have the largest weight value and short-term driving style indices calculated before may be set to have weight values which are smaller sequentially. Here, the sum of the n number of weight values is 1. Namely, the recent short-term driving style most greatly affects the long-term driving style. The present disclosure provides a single exemplary method for calculating a short-term driving style index and a long-term driving style index, and the method for calculating a short-term driving style index and a long-term driving style index is not limited to the exemplary methods disclosed in the present disclosure.

At the time when the vehicle enters the running mode, if the vehicle does not have a record of having been switched to the sports mode, the driving style analyzing unit 200 calculates the first long-term driving style index SI_long1 and stores the same as a final long-term driving style index SI_long. At the time when the vehicle enters the sports mode, if the vehicle does not have a record of having been switched to the running mode, the driving style analyzing unit 200 calculates the second long-term driving style index SI_long2.

When the vehicle has been switched from the running mode to the sports mode, the driving style analyzing unit 200 temporarily stores the first long-term driving style index SI_long1 of the running mode and calculates the second long-term driving style index SI_long2.

When the vehicle has been switched from the sports mode to the running mode, the driving style analyzing unit 200 compares the magnitudes of temporarily stored first long-term driving style index SI_long1 and the second long-term driving style index SI_long2, and only when the second long-term driving style index SI_long2 is greater than the first long-term driving style index SI_long1, the driving style analyzing unit 200 updates the second long-term driving style index SI_long2 as a final long-term driving style index SI_long.

Namely, the driving style analyzing unit 200 determines driving styles of the driver in each of the running mode and the sports mode, and although the driving style of the driver in the sports mode has been changed into a mild style in comparison to the driving style in the running mode, the driving style analyzing unit 200 reflects the driving style of the driver before the running mode is switched to the sports mode.

In general, the sports mode has higher acceleration performance than that of the running mode, and thus, when the driver having a normal driving style in the running mode drives the vehicle in the sports mode, he may drive mild because acceleration of the vehicle is relatively high. In this case, if driving style index is reduced according to the mild style of the driver, the driver's satisfaction with running may be lowered when the sports mode is switched to the running mode in which the driver drives the vehicle.

Thus, the driving style analyzing unit 200 according to various embodiments of the present invention sets a case in which a driving style of the driver in the sports mode is mild, relative to the immediately previous running mode, as an exceptional condition to prevent the driving style index from being reduced to be smaller than that of the immediately previous running mode, thus satisfying the driver's satisfaction with running.

The running mode determining unit 300 determines a preference pattern of each driving style of the driver by using the long-term driving index, and determines an optimal running mode according to each preference pattern. For example, the running mode determining unit 300 may determine a mileage drive (eco-drive) mode, a normal mode, a sports mode, and the like, on the basis of the driving style indices. Namely, since a running mode may be automatically set according to whether the driver's preference pattern is mild or sporty, an additional mode selection button is not required.

The running mode determining unit 300 may change an engine torque map, an engine torque filter, a speed pattern, a coupling sense with respect to a target gear shift stage, and the like, according to the determined running mode. The changed characteristics may be applied to an engine and an automatic transmission.

Figure 2:
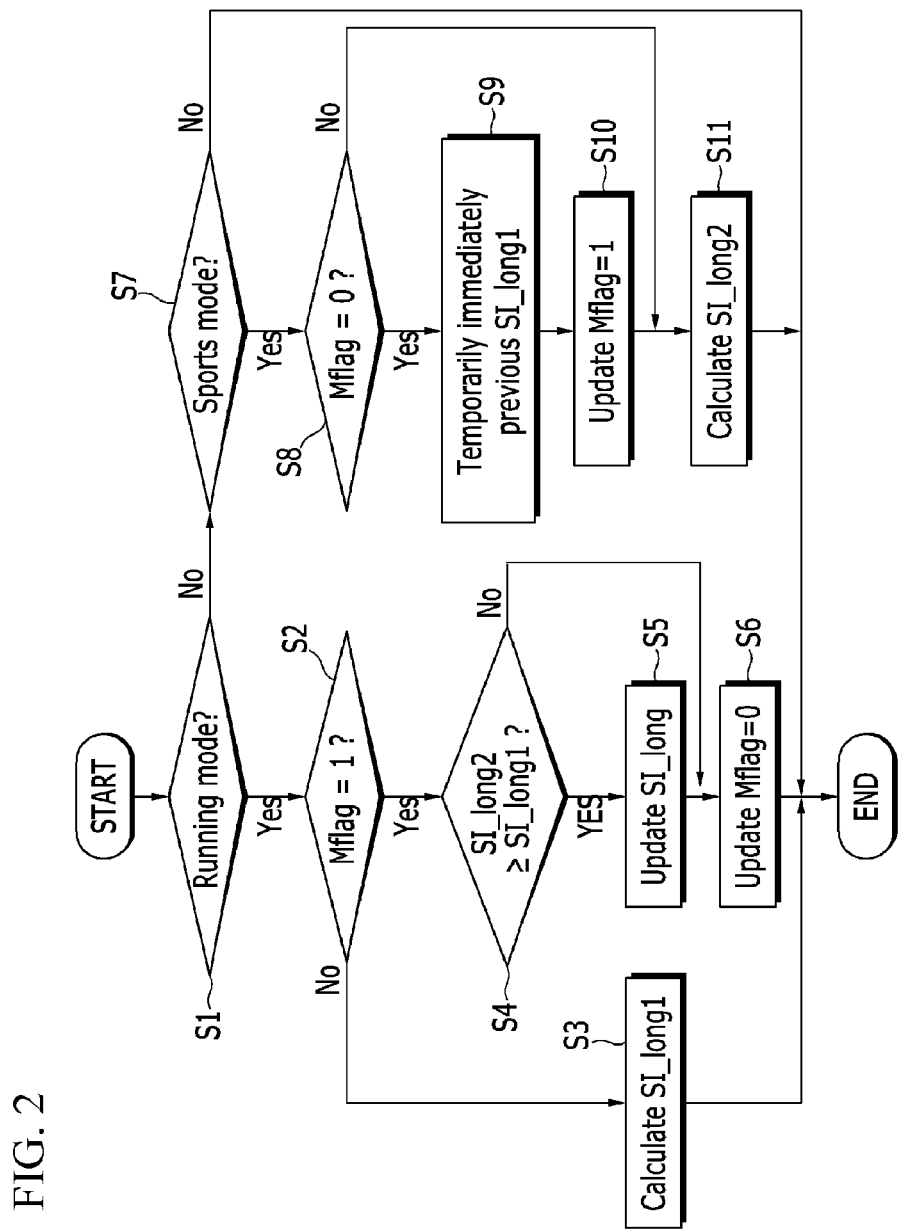
FIG. 2 is a flow chart illustrating an exemplary method for controlling a shift of an automatic transmission in a vehicle according to the present invention.

FIG. 2 is a flow chart illustrating a method for controlling a shift of an automatic transmission in a vehicle according to various embodiments of the present invention.

Referring to FIG. 2, first, the driving style analyzing unit 200 determines whether a shift lever is positioned in a driving (D) range (step S1). When the shift lever is positioned in the driving (D) range, namely, when the vehicle is in the running mode, according to the determination results, the driving style analyzing unit 200 determines whether a mode flag Mflag has a value 1 (step S2).

When the mode flag Mflag is not 1 according to the determination results, the driving style analyzing unit 200 calculates a first long-term driving style index SI_long1 and stores the same (step S3). Meanwhile, when the mode flag Mflag is 1, the driving style analyzing unit 200 determines that the vehicle has a record of having been run in the sports mode before it drives in the running mode.

Then, the v compares a magnitude of the temporarily stored first long-term driving style index SI_long1 of the immediately previous running mode and that of the second long-term driving style index SI_long2 calculated in the sports mode (step S4).

When the magnitude of the second long-term driving style index SI_long2 is greater than the temporarily stored first long-term driving style index SI_long1 of the immediately previous running mode, the driving style analyzing unit 200 updates the second long-term driving style index SI_long2 as a final driving style index SI_long (step S5).

Meanwhile, when the magnitude of the second long-term driving style index SI_long2 is smaller than the temporarily stored first long-term driving style index SI_long1 of the immediately previous running mode according to the comparison results in step S4, the driving style analyzing unit 200 processes the second long-term driving style index SI_long2 as an exceptional condition, such that the final driving style index SI_long is not updated.

Thereafter, the driving style analyzing unit 200 updates the mode flag Mflag to 0 and stores the same (step S6). Meanwhile, when the gear lever is not positioned in the driving (D) range in step S1, the driving style analyzing unit 200 determines whether the vehicle is in a manual mode, namely, in a sports mode (step S7). When the vehicle is in the sports mode according to the determination results, the driving style analyzing unit 200 determines whether the mode flag Mflag is 0 (step S8).

When the mode flag Mflag is 0 according to the determination results, the driving style analyzing unit 200 determines whether the vehicle has been run in the running mode. Namely, the driving style analyzing unit 200 determines that the running mode has been switched to the sports mode currently, and temporarily stores the first long-term driving style index SI_long1 in the running mode at the switched point (step S9).

Thereafter, the driving style analyzing unit 200 updates the mode flag Mflag to 1, and stores the same (step S10). Thereafter, the driving style analyzing unit 200 calculates a second long-term driving style index SI_long2 during the running section of the sports mode (step S11).

Meanwhile, when the mode flag Mflag is not 0 according to the determination results in step S8, the driving style analyzing unit 200 performs step S11, omitting steps S9 and S10.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a shift of an automatic transmission in a vehicle including a gear lever shifted to any one of a running mode and a sports mode, the method comprising:
   calculating a first long-term driving style index by using running information in the running mode;
   calculating a second long-term driving style index by using running information in the sports mode;
   when the vehicle is switched from the running mode to the sports mode, temporarily storing the first long-term driving style index at the switching point; and
   when the sports mode is switched to the running mode, if the second long-term driving style index is greater than the temporarily stored first long-term driving style index, updating the second long-term driving style index as a final long-term driving style index, and determining a driving style.

2. The method of claim 1, further comprising:
   initializing mode flags indicating switching states between the running mode and the sports mode by first and second values, respectively, with the first value.

3. The method of claim 2, wherein the calculating of the first long-term driving style index comprises:
   calculating a short-term driving style index according to the running information; and
   if the mode flag has the first value when the vehicle enters the running mode, updating the first long-term driving style index to the final driving style index by using the short-term driving style indices accumulated during a predetermined period of time.

4. The method of claim 3, wherein the running information includes a speed of the vehicle, a speed of a forward vehicle, and acceleration of the vehicle.

5. The method of claim 3, wherein the updating the first long-term driving style index to the final driving style index comprises:
   when the mode flag has the second value, comparing a magnitude of the temporarily stored first long-term driving style index and that of the second long-term driving style index; and
   updating the mode flag to the first value.

6. The method of claim 5, further comprising:
   when the second long-term driving style index is smaller than the temporarily stored first long-term driving style index, updating the first long-term driving style index as a final long-term driving style index.

7. The method of claim 2, wherein the temporarily storing the first long-term driving style index comprises:
   determining whether the mode flag has the first value when the vehicle enters the sports mode;
   when the mode flag has the first value, extracting the first long-term driving style index of the running mode immediately before entering the sports mode; and
   updating the mode flag to the second value.

8. The method of claim 7, further comprising:
   when the mode flag has the second value, calculating the second long-term driving style index.

* * * * *